United States Patent
Kim et al.

(10) Patent No.: US 12,074,318 B2
(45) Date of Patent: *Aug. 27, 2024

(54) LITHIUM ELECTRODE AND LITHIUM SECONDARY BATTERY COMPRISING SAME

(71) Applicant: LG ENERGY SOLUTION, LTD., Seoul (KR)

(72) Inventors: Kihyun Kim, Daejeon (KR); Kyung Oh Kim, Daejeon (KR); Yeyoung Ha, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/517,884

(22) Filed: Nov. 22, 2023

(65) Prior Publication Data
US 2024/0088365 A1 Mar. 14, 2024

Related U.S. Application Data

(63) Continuation of application No. 16/968,191, filed as application No. PCT/KR2019/009243 on Jul. 25, 2019, now Pat. No. 11,862,791.

(30) Foreign Application Priority Data

Jul. 30, 2018 (KR) ........................ 10-2018-0088273
Jul. 24, 2019 (KR) ........................ 10-2019-0089820

(51) Int. Cl.
*H01M 4/38* (2006.01)
*H01M 4/134* (2010.01)
(Continued)

(52) U.S. Cl.
CPC ........... *H01M 4/382* (2013.01); *H01M 4/134* (2013.01); *H01M 4/366* (2013.01); *H01M 4/62* (2013.01);
(Continued)

(58) Field of Classification Search
None
See application file for complete search history.

(56) References Cited

U.S. PATENT DOCUMENTS

2005/0042503 A1  2/2005  Kim et al.
2005/0042516 A1  2/2005  Hwang et al.
(Continued)

FOREIGN PATENT DOCUMENTS

CN   1658411 A   8/2005
CN   104040756 A   9/2014
(Continued)

OTHER PUBLICATIONS

Gao et al., "Interfacial Chemistry Regulation via as Skin-Grafting Strategy Enables High-Performance Lithium-Metal Batteries", Journal of the American Chemical Society, 139, 2017, pp. 15288-15291.
(Continued)

*Primary Examiner* — Robert S Carrico
(74) *Attorney, Agent, or Firm* — Birch, Stewart, Kolasch & Birch, LLP

(57) ABSTRACT

A lithium electrode and a lithium secondary battery the same are disclosed. More specifically, a lithium electrode is disclosed that can increase the lifetime of the battery by providing a protective layer containing a copolymer containing an acetal functional group forming a stable SEI layer through a chemical reaction with lithium metal and a fluorine-based functional group capable of forming a LiF-rich SEI layer on the surface of the lithium metal to inhibit the
(Continued)

formation of lithium dendrite and inhibit the side reaction of lithium metal and electrolyte solution.

10 Claims, 6 Drawing Sheets

(51) Int. Cl.
  *H01M 4/36* (2006.01)
  *H01M 4/62* (2006.01)
  *H01M 10/052* (2010.01)

(52) U.S. Cl.
  CPC ......... *H01M 4/628* (2013.01); *H01M 10/052* (2013.01)

(56) References Cited

U.S. PATENT DOCUMENTS

| | | |
|---|---|---|
| 2005/0191556 A1 | 9/2005 | Kim |
| 2014/0287294 A1 | 9/2014 | Lee |
| 2016/0118651 A1 | 4/2016 | Kovalev et al. |
| 2016/0172681 A1 | 6/2016 | Yang et al. |
| 2016/0204476 A1 | 7/2016 | Kobayashi |
| 2017/0062829 A1 | 3/2017 | Ryo et al. |
| 2018/0301893 A1 | 10/2018 | Choi et al. |
| 2019/0051940 A1 | 2/2019 | Park et al. |
| 2019/0067675 A1 | 2/2019 | Xiao |
| 2019/0089003 A1 | 3/2019 | Noguchi et al. |
| 2019/0140257 A1 | 5/2019 | Chae et al. |
| 2021/0210748 A1 | 7/2021 | Hamon et al. |

FOREIGN PATENT DOCUMENTS

| | | |
|---|---|---|
| CN | 105703006 A | 6/2016 |
| CN | 107634184 A | 1/2018 |
| JP | 11-26018 A | 1/1999 |
| JP | 2001-52676 A | 2/2001 |
| JP | 2015-88487 A | 5/2015 |
| JP | 2017-533555 A | 11/2017 |
| KR | 10-2002-0091748 A | 12/2002 |
| KR | 10-2005-0020498 A | 3/2005 |
| KR | 10-2005-0023123 A | 3/2005 |
| KR | 10-2014-0125970 A | 10/2014 |
| KR | 10-2017-0026098 A | 3/2017 |
| KR | 10-2018-0036600 A | 4/2018 |
| KR | 10-2018-0041086 A | 4/2018 |
| WO | WO 2005/028402 A2 | 3/2005 |
| WO | WO 2015/030230 A1 | 3/2015 |
| WO | WO 2017/154788 A1 | 9/2017 |
| WO | WO 2018/070847 A1 | 4/2018 |
| WO | WO 2018/233413 A1 | 12/2018 |

OTHER PUBLICATIONS

Guoqiang et al., "Lithium-Ion Battery Electrolyte Containing Fluorinated Solvent and Additive," Progress in Chemistry, vol. 28, No. 9. 2016, pp. 1299-1312.

International Search Report issued in PCT/KR2019/009243 (PCT/ISA/210), dated Oct. 28, 2019.

Machine translation of WO 2018/233413 A1 (Year:2018).

[Figure 1]
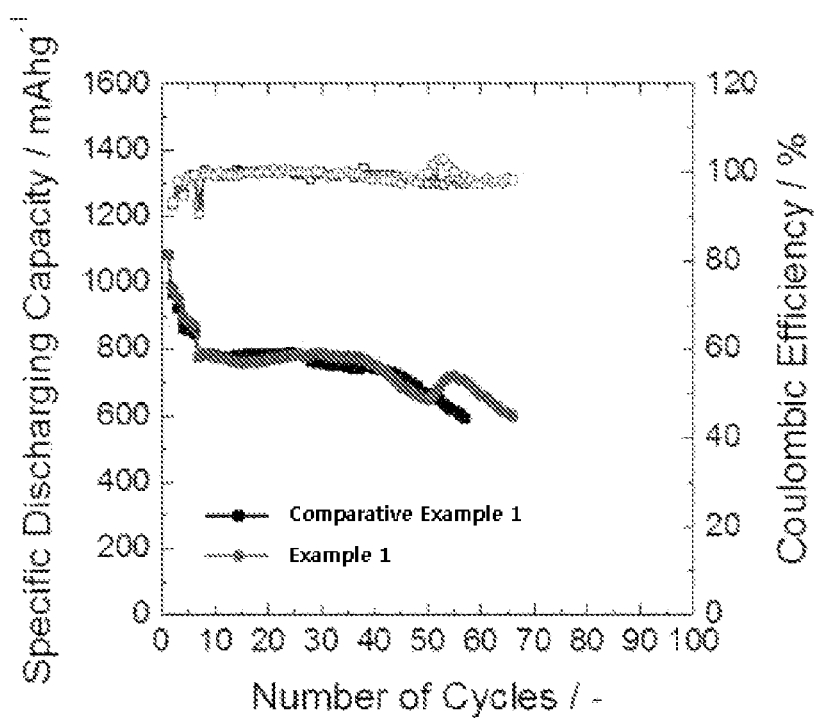

【Figure 2】
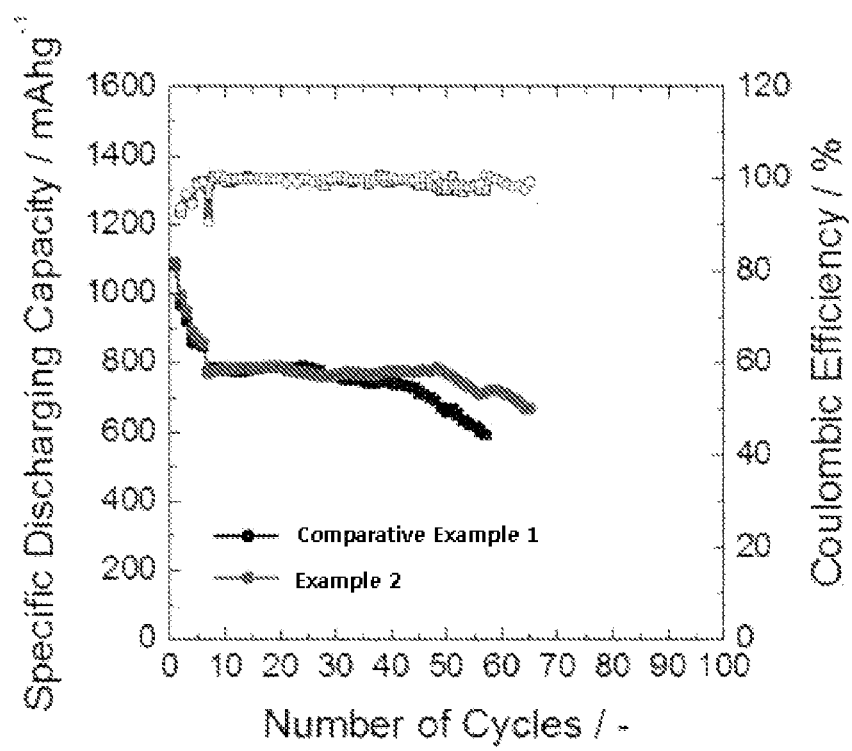

【Figure 3】
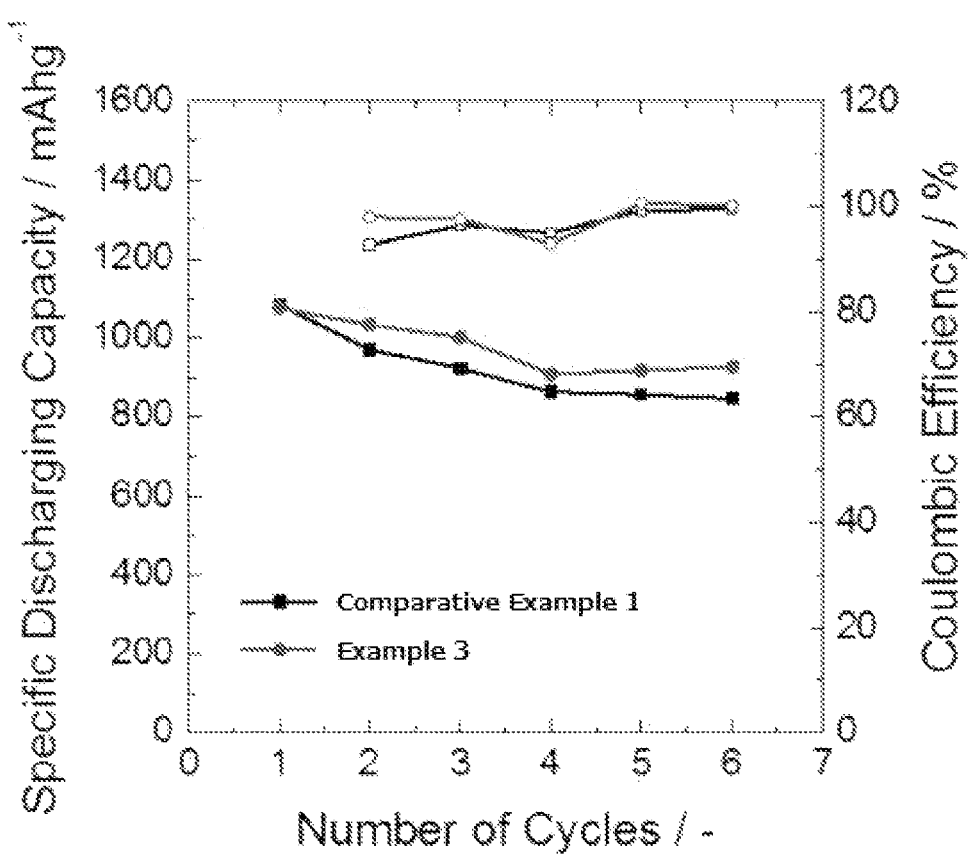

[Figure 4]
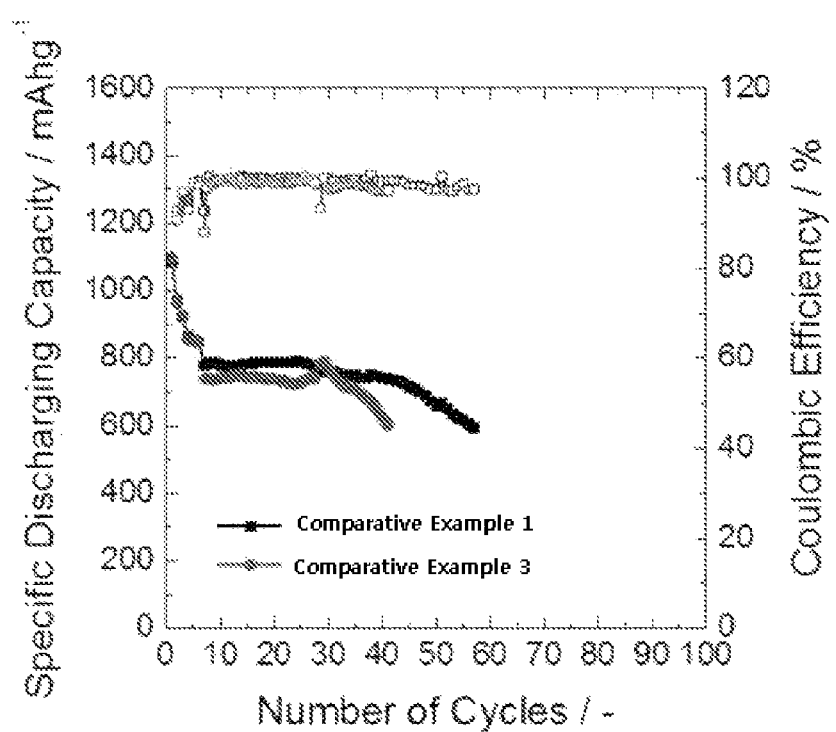

【Figure 5】
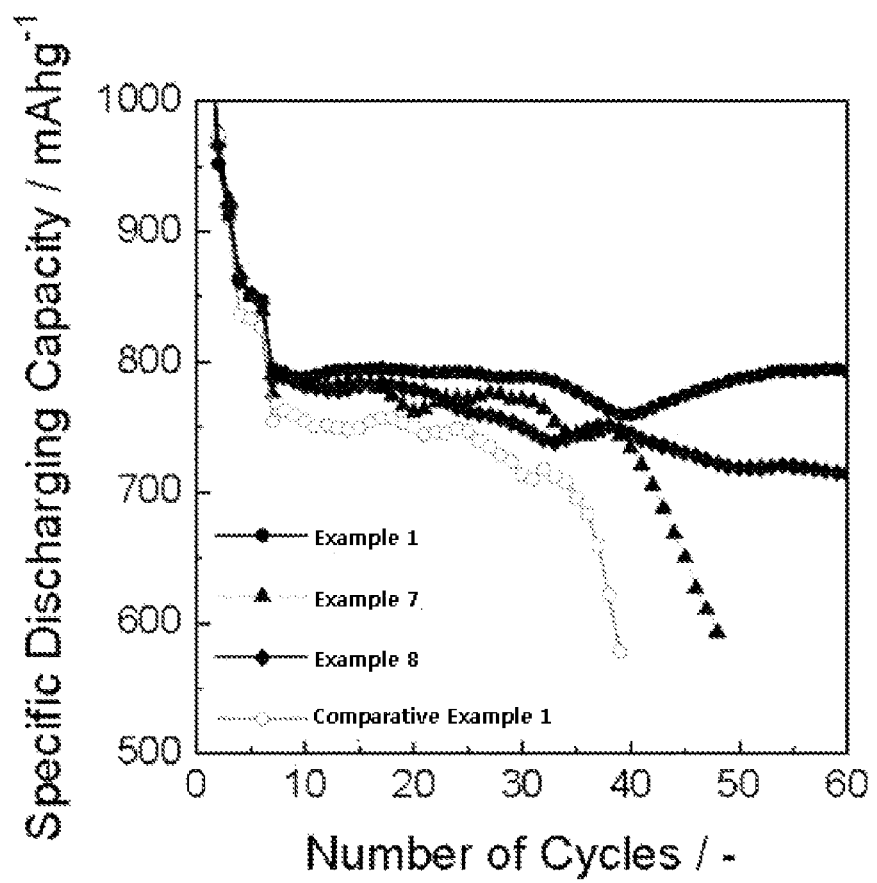

【Figure 6】
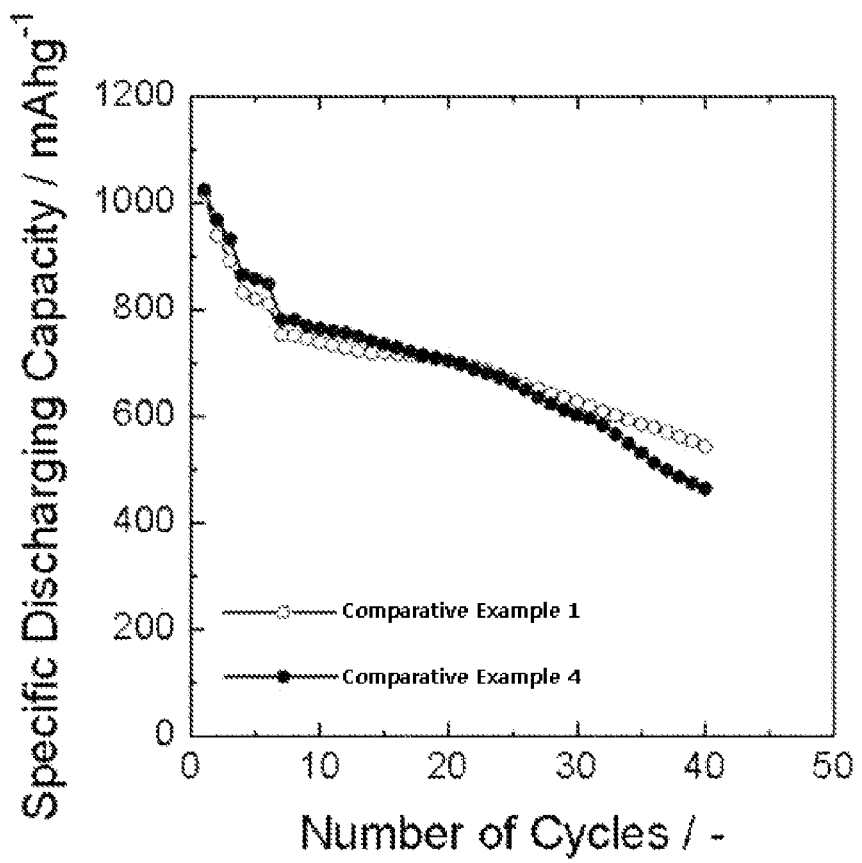
【Figure 7】
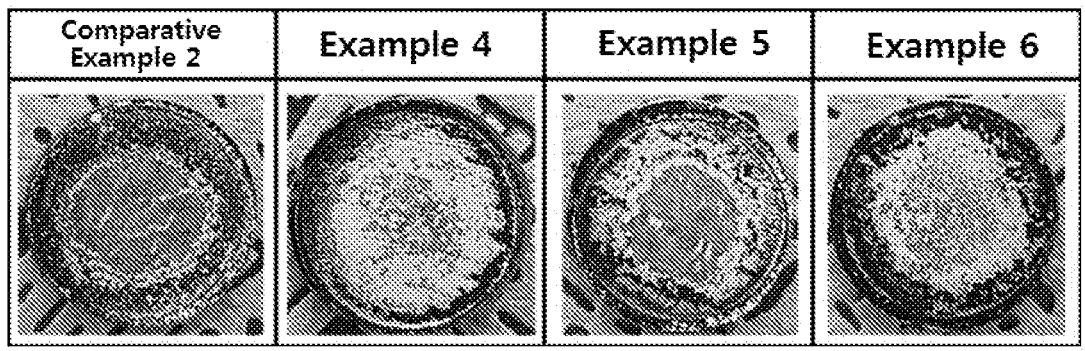

LITHIUM ELECTRODE AND LITHIUM SECONDARY BATTERY COMPRISING SAME

TECHNICAL FIELD

This application is a Continuation of application Ser. No. 16/968,191, filed on Aug. 7, 2020, which is the U.S. National Phase of PCT/KR2019/009243, filed Jul. 25, 2019, and which claims the benefits of priorities based on Korean Patent Application No. 10-2018-0088273, filed on Jul. 30, 2018 and Korean Patent Application No. 10-2019-0089820, filed on Jul. 24, 2019, the entire contents of which are incorporated herein by reference.

The present invention relates to a lithium electrode having improved lifetime characteristics and a lithium secondary battery comprising the same.

BACKGROUND ART

Until a recent date, there has been considerable interest in developing batteries with high energy densities using lithium as a negative electrode. For example, as compared to other electrochemical systems with a lithium inserted carbon negative electrode and a nickel or cadmium electrode that reduce the energy density of the battery by increasing the weight and volume of the negative electrode due to the presence of the non-electroactive material, since lithium metal has low weight and high capacity characteristics, lithium metal has attracted much attention as a negative electrode active material for electrochemical batteries. Lithium metal negative electrode, or negative electrodes, which mainly comprise lithium metal, provide the opportunity to construct a battery that is lighter and has a higher energy density than the battery such as a lithium-ion, nickel metal hydride or nickel-cadmium battery. These features are highly desirable for batteries for portable electronic devices, such as cell phones and lap-top computers, where premiums are paid with low weighted value.

Conventional lithium ion batteries have an energy density of 700 wh/l by using graphite as a negative electrode and using lithium cobalt oxide (LCO) as a positive electrode. However, in recent years, the fields requiring high energy density are expanding, and thus there is a continuing need to increase the energy density of a lithium ion battery. For example, even in order to increase the mileage of an electric car by a single charge to more than 500 km, an increase in energy density is required.

In order to increase the energy density of the lithium ion battery, the use of lithium electrode is increasing. However, there is a problem that lithium metal is difficult to handle in process because it is highly reactive and difficult to handle.

If lithium metal is used as a negative electrode of a lithium secondary battery, the lithium metal reacts with impurities such as electrolytes and water or organic solvents, lithium salts and the like to form a passivation layer (Solid Electrolyte Interphase: SEI). Such a passivation layer causes localized current density differences to promote the formation of dendrite by lithium metal during charging, and the dendrite grows gradually during charging/discharging, thereby causing an internal short circuit between the positive electrode and the negative electrode. Also, the dendrite has a mechanically weak part (bottle neck), and thus forms inert lithium (dead lithium) which loses electrical contact with the current collector during discharging, thereby reducing the capacity of the battery, shortening the cycle lifetime, and adversely affecting the stability of the battery.

In order to improve the problems of the lithium metal negative electrode as described above, a lithium metal negative electrode with a protective layer having various compositions or forms has been developed.

Korean Patent Publication No. 2018-0041086 relates to a protective layer formed by applying a slurry containing a copolymer to a lithium metal negative electrode. As a co-monomer for forming the copolymer, perfluoro-2,2-dimethyl-1,3-dioxol (PDD) or perfluoro-2-methylene-4-methyl-1,3-dioxolane (PMD) is illustrated. The lithium metal negative electrode on which the protective layer including the copolymer is formed may prevent the formation of the dendrite, but has a problem that it is not easy to distribute $Li^+$ ions uniformly on the surface of the electrode and to effectively form the SEI layer so as to achieve an uniform plating and stripping of lithium metal to improve the performance of the battery.

In addition, Korean Patent Publication No. 2002-0091748 discloses a protective membrane for inhibiting the formation of dendrite on the surface of a lithium metal negative electrode, which contains a fluorine-containing polymer. However, due to the protective membrane, the function of uniformly distributing $Li^+$ ions on the surface of the electrode, effectively forming the SEI layer, and in particular, preventing the shuttle phenomenon due to polysulfide formed in the positive electrode when applied to a lithium-sulfur secondary battery is insufficient.

As described above, until now, researches on the development of a protective layer to prevent the growth of the dendrite of lithium metal in a battery using lithium metal negative electrode have been made, but the results of the researches on the protective layer which enable the overall performance of the battery are insufficient.

Therefore, in order to improve the performance of the battery in the battery using lithium metal as a negative electrode, it is urgent to develop a lithium metal negative electrode having a protective layer formed thereon, which enables uniform distribution of $Li^+$ ions on the electrode surface and effective formation of a SEI layer, and can prevent the shuttle phenomenon due to polysulfide formed in the positive electrode when applied to a lithium-sulfur secondary battery.

PRIOR ART DOCUMENT (Patent Document 1) Korean Patent Publication No. 2018-0041086.

(Patent Document 2) Korean Patent Publication No. 2002-0091748.

DISCLOSURE

Technical Problem

As a result of various studies to solve the above problems, the present inventors have confirmed that by forming a protective layer on the lithium electrode while using a copolymer containing an acetal functional group and a fluorine-based functional group, a stable LiF-rich SEI (Solid Electrolyte Interphase) layer can be formed on the surface of lithium metal to prevent the formation of lithium dendrite, and thus suppress the side reaction between the lithium metal and the electrolyte solution, thereby increasing the lifetime of the battery.

Therefore, it is an object of the present invention to provide a lithium electrode having a protective layer capable of preventing the formation of lithium dendrite and inhibiting side reactions between lithium metal and electrolyte solution to increase the lifetime of the battery.

In addition, it is another object of the present invention to provide a lithium secondary battery comprising the lithium electrode as described above.

Technical Solution

In order to achieve the above objects, the present invention provides a lithium electrode comprising a lithium metal, and a protective layer on at least one side of the lithium metal, wherein the protective layer comprises a copolymer containing an acetal and a fluorine-based material.

The copolymer may be represented by monomer A containing the acetal and monomer B containing the fluorine-based material.

The monomer containing an acetal is an acetal functional group-containing monomer, and the acetal functional group may be at least one selected from the group consisting of 1,3-dioxolane and 2-methyl-1,3-dioxolane.

The monomer containing the acetal may be at least one selected from the group consisting of (N-2,2-dimethyl-1,3-dioxolane-4-methyl)-5-norbornene-exo-2,3-dicarboximide; N-(4-methyl-2,2-dimethyl-1,3-dioxolane)-5-norbornene-2,3-dicarboxylic acid imide; N-(4-methyl-2,2,4-trimethyl-1,3-dioxolane)-5-norbornene-2,3-dicarboxylic acid imide; N-(5-methyl-2,2-dimethyl-1,3-dioxane)-5-norbornene-2,3-dicarboxylic acid imide; N-(5-methyl-2,2,5-trimethyl-1,3-dioxane)-5-norbornene-2,3-dicarboxylic acid imide; and (2,2-dimethyl-1,3-dioxolane-4-yl)methyl-5-norbornene-2-carboxylate.

The monomer containing the fluorine-based material is a monomer containing a fluorine-based functional group, and the fluorine-based functional group may be at least one selected from the group consisting of fluorocarbon and penta-fluorophenyl.

The monomer containing the fluorine-based material may be at least one selected from the group consisting of 3,3,4,4,5,5,6,6,7,7,8,8,9,9,10,10,10-heptadecafluorodecyl 5-norbornene-2-carboxylate; N-(3,3,4,4,5,5,6,6,7,7,8,8,9,9,10,10,10-heptadecafluorodecyl)-5-norbornene-exo-2,3-dicarboximide; N-(2-(2,2,3,3,4,4,4-heptafluorobutyl))-5-norbornene-2,3-dicarboxylic acid; N-(2-(2,2,3,3,4,4,4-heptafluorobutyl))-5-norbornene-exo-2,3-dicarboximide; N-(pentafluorophenyl)-5-norbornene-2,3-dicarboxylic acid; and N-(pentafluorophenyl)-5-norbornene-exo-2,3-dicarboximide.

The molar ratio of the monomer containing the acetal and the monomer containing the fluorine-based material may be 3 to 7:7 to 3.

The thickness of the protective layer may be 0.1 μm to 10 μm.

The lithium metal may be a layer formed on one side of the current collector, or may be in the form of a structure which is formed by lithium metal aggregated in the form of particle.

The thickness of the lithium metal may be 5 μm to 150 μm.

The present invention also provides a lithium secondary battery comprising the lithium electrode.

The lithium secondary battery may be a lithium-sulfur secondary battery.

Advantageous Effects

According to the present invention, a lithium electrode having a protective layer which comprises a copolymer containing an acetal functional group and a fluorine-based functional group can be manufactured. The protective layer is excellent in hardness and this is effective in suppressing the formation of lithium dendrite.

According to the lithium electrode of the present invention, the acetal functional group contained in the protective layer chemically reacts with the lithium metal to form a stable SEI layer on the surface of the lithium metal.

Also, according to the lithium electrode of the present invention, the fluorine-based functional group contained in the protective layer can form a LiF-rich SEI layer on the surface of the lithium metal.

In addition, the protective layer can prevent side reactions between the lithium metal and the electrolyte solution. In particular, when the protective layer is formed on the lithium negative electrode of the lithium-sulfur secondary battery, the lifetime of the battery can be increased by suppressing the side reaction of the polysulfide leached from the positive electrode of the lithium-sulfur secondary battery and lithium negative electrode.

DESCRIPTION OF DRAWINGS

FIG. 1 is a graph showing specific discharging capacity and coulombic efficiency measured by charging/discharging coin cells manufactured in Example 1 and Comparative Example 1, respectively.

FIG. 2 is a graph showing discharging specific capacity and coulombic efficiency measured by charging/discharging coin cells manufactured in Example 2 and Comparative Example 1, respectively.

FIG. 3 is a graph showing specific discharging capacity and coulombic efficiency measured by charging/discharging coin cells manufactured in Example 3 and Comparative Example 1, respectively.

FIG. 4 is a graph showing specific discharging capacity and coulombic efficiency measured by charging/discharging coin cells manufactured in Comparative Example 1 and Comparative Example 3, respectively.

FIG. 5 is a graph showing specific discharging capacity measured by charging/discharging coin cells manufactured in Examples 1, 7, and 8, and Comparative Example 1, respectively.

FIG. 6 is a graph showing specific discharging capacity measured by charging/discharging coin cells manufactured in Comparative Example 1 and Comparative Example 4, respectively.

FIG. 7 is a photograph showing the surfaces of the lithium negative electrodes in a charged state observed after charging and discharging 25 times for the coin cell-type lithium-lithium batteries of Examples 4 to 6 and Comparative Example 2.

BEST MODE

Hereinafter, the present invention will be described in more detail in order to facilitate understanding of the present invention.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

Lithium Electrode the present invention provides relates to a lithium electrode comprising a lithium metal and a protective layer formed on at least one side of the lithium metal, wherein the protective layer is formed by a copolymer containing an acetal and a fluorine-based material.

In the present invention, the copolymer containing an acetal and a fluorine-based material may be represented by a random copolymer of monomer A containing an acetal and monomer B containing a fluorine-based material.

For example, the monomers A and B are not particularly limited to cyclic olefinic compounds, but specific examples thereof comprise norbornene and derivatives thereof. The weight average molecular weight of the random copolymer of monomer A and monomer B may be in the range of 10,000 to 1,000,000, preferably 15,000 to 900,000, more preferably 20,000 to 800,000.

The monomer A containing the acetal is a monomer having an acetal functional group, and the acetal functional group may be at least one selected from the group consisting of 1,3-dioxolane, and 2-methyl-1,3-dioxolane, and preferably, 1,3-dioxolane.

Specifically, the monomer A containing the acetal may be at least one selected from the group consisting of (N-2,2-dimethyl-1,3-dioxolane-4-methyl)-5-norbornene-exo-2,3-dicarboximide; N-(4-methyl-2,2-dimethyl-1,3-dioxolane)-5-norbornene-2,3-dicarboxylic acid imide; N-(4-methyl-2,2,4-trimethyl-1,3-dioxolane)-5-norbornene-2,3-dicarboxylic acid imide; N-(5-methyl-2,2-dimethyl-1,3-dioxane)-5-norbornene-2,3-dicarboxylic acid imide; N-(5-methyl-2,2,5-trimethyl-1,3-dioxane)-5-norbornene-2,3-dicarboxylic acid imide; and (2,2-dimethyl-1,3-dioxolane-4-yl)methyl-5-norbornene-2-carboxylate, and preferably, (N-2,2-dimethyl-1,3-dioxolane-4-methyl)-5-norbornene-exo-2,3-dicarboximide.

In addition, the monomer B containing the fluorine-based material is a monomer containing a fluorine-based functional group, and the fluorine-based functional group may be at least one selected from the group consisting of fluorocarbon and penta-fluorophenyl, and preferably, fluorocarbon.

Specifically, the monomer B containing the fluorine-based material may be at least one selected from the group consisting of 3,3,4,4,5,5,6,6,7,7,8,8,9,9,10,10,10-heptadecafluorodecyl 5-norbornene-2-carboxylate; N-(3,3,4,4,5,5,6,6,7,7,8,8,9,9,10,10,10-heptadecafluorodecyl)-5-norbornene-exo-2,3-dicarboximide; N-(2-(2,2,3,3,4,4,4-heptafluorobutyl))-5-norbornene-2,3-dicarboxylic acid; N-(2-(2,2,3,3,4,4,4-heptafluorobutyl))-5-norbornene-exo-2,3-dicarboximide; N-(pentafluorophenyl)-5-norbornene-2,3-dicarboxylic acid; and N-(pentafluorophenyl)-5-norbornene-exo-2,3-dicarboximide, and preferably, 3,3,4,4,5,5,6,6,7,7,8,8,9,9,10,10,10-heptadecafluorodecyl 5-norbornene-2-carboxylate.

In the copolymer, the molar ratio of monomer A containing the acetal and monomer B containing the fluorine-based material may be 3 to 7:7 to 3, preferably 4 to 6:6 to 4, more preferably 4.5 to 5.5:5.5 to 4.5. If the ratio is out of the above range, the lifetime of the battery may be reduced.

The protective layer of the lithium electrode can be formed to have an appropriate thickness in consideration of the performance of the desired electrode or cell.

In the present invention, the thickness of the protective layer formed using a copolymer containing an acetal and a fluorine-based material may be 10 μm or less, preferably 0.1 μm to 5 μm, more preferably 0.5 μm to 2 μm. If the thickness is less than the above range, the effect of inhibiting the formation of lithium dendrite by the protective layer is insignificant and a side reaction may occur between the lithium metal and the electrolyte solution. If the thickness exceeds the above range, the electrode may be thickened and thus may be disadvantageous to commercialization.

In the present invention, the lithium metal is formed on the current collector as a positive electrode mixture or a negative electrode mixture, and the lithium metal may comprise all the form of a layer, and the form of a structure which is formed by lithium metal aggregated in the form of particle, which is not a structure in which lithium metal is not formed as a layer.

The lithium metal may have a thickness of 5 μm to 150 μm, preferably 15 μm to 130 μm, and more preferably 25 μm to 100 μm. If the thickness of the lithium metal is less than the above range, the capacity and lifetime characteristics of the battery may be lowered. If the thickness of the lithium metal exceeds the above range, the thickness of the lithium electrode to be manufactured may be thickened and thus may be disadvantageous to commercialization.

In addition, the lithium metal may be formed on one surface of the current collector. In this case, the protective layer may be formed on the entire surface of the lithium metal, except for the surface where the lithium metal layer is in contact with the current collector.

In addition, if the current collector is a porous current collector, lithium metal may be contained in the pores in the porous current collector, and at this time, the protective layer may be provided on the entire surface of the porous current collector, except for the terminal connected to the porous current collector and extended to the outside.

In addition, the current collector may be one selected from the group consisting of copper, aluminum, nickel, titanium, sintered carbon, and stainless steel. Preferably the current collector may be a copper current collector.

Lithium Secondary Battery

The present invention also relates to a lithium secondary battery comprising the lithium electrode as described above.

In the lithium secondary battery, the lithium electrode may be included as a negative electrode, and the lithium secondary battery may include an electrolyte solution provided between the negative electrode and the positive electrode.

The shape of the lithium secondary battery is not limited, and may be, for example, coin type, flat type, cylindrical type, horn type, button type, sheet type, or stacked type. In addition, the lithium secondary battery may further include a respective tank for storing a positive electrode electrolyte solution and a negative electrode electrolyte solution, and a pump for moving each electrolyte solution to the electrode cell, and thus may be manufactured as a flow battery.

The electrolyte solution may be an electrolyte solution impregnated with the negative electrode and the positive electrode.

The lithium secondary battery may further comprise a separator provided between the negative electrode and the positive electrode. The separator disposed between the positive electrode and the negative electrode is not particularly limited as long as it separates or isolates the positive and negative electrodes from each other, and allows the transport of ions between the positive and negative electrodes, and the separator may be, for example, a non-conductive porous membrane or an insulating porous membrane. More specifically, polymer nonwovens such as nonwoven fabric of polypropylene material or nonwoven fabric of polyphenylene sulfide material; or porous films of olefin resins such as polyethylene and polypropylene may be exemplified, and it is also possible to use 2 or more types of these together.

The lithium secondary battery may further include a positive electrode electrolyte solution on the positive electrode side and a negative electrode electrolyte solution on the negative electrode side separated by a separator. The positive electrode electrolyte solution and the negative electrode electrolyte solution may include a solvent and an electrolytic salt, respectively. The positive electrode electrolyte solution and the negative electrode electrolyte solution may be the same or different from each other.

The electrolyte solution may be an aqueous electrolyte solution or a non-aqueous electrolyte solution. The aqueous electrolyte solution may contain water as a solvent, and the non-aqueous electrolyte solution may contain a non-aqueous solvent as a solvent.

The nonaqueous solvent may be selected from those generally used in the art and is not particularly limited, and for example, may be selected from the group consisting of a carbonate-based solvent, an ester-based solvent, an ether-based solvent, a ketone-based solvent, an organosulfur-based solvent, an organophosphorous-based solvent, an aprotic solvent, or a combination thereof.

The electrolytic salt refers to those that dissociate into cations and anions in water or non-aqueous organic solvents, and is not particularly limited as long as it can deliver lithium ion in the lithium secondary battery. The electrolytic salt may be selected from those generally used in the art.

The concentration of the electrolytic salt in the electrolyte solution may be 0.1 M or more and 3 M or less. In this case, the charging/discharging characteristics of the lithium secondary battery may be effectively expressed.

The electrolyte may be a solid electrolyte membrane or a polymer electrolyte membrane.

The material of the solid electrolyte membrane and the polymer electrolyte membrane is not particularly limited, and may be those generally used in the art. For example, the solid electrolyte membrane may comprise a composite metal oxide, and the polymer electrolyte membrane may be a membrane having a conductive polymer inside the porous substrate.

The positive electrode refers to an electrode that accepts electrons and reduces lithium-containing ions when the battery is discharging in the lithium secondary battery. On the contrary, when the battery is charged, it acts as a negative electrode (oxidation electrode), and the positive electrode active material is oxidized to release electrons and lose lithium-containing ions.

The positive electrode may comprise a positive electrode current collector and a positive electrode active material layer formed on the positive electrode current collector.

In the present invention, the material of the positive electrode active material of the positive electrode active material layer is not particularly limited as long as it is applied to a lithium secondary battery together with the negative electrode to reduce lithium-containing ions during discharging and oxidize lithium-containing ions during charging. The material of the positive electrode active material can be, for example, a composite material based on a transition metal oxide or sulfur (S), and may specifically include at least one of $LiCoO_2$, $LiNiO_2$, $LiFePO_4$, $LiMn_2O_4$, $LiNi_xCo_yMnzO_2$ (wherein, $x+y+z=1$), $Li_2FeSiO_4$, $Li_2FePO_4F$ and $Li_2MnO_3$.

In addition, if the positive electrode is a composite material based on sulfur (S), the lithium secondary battery may be a lithium-sulfur secondary battery. The composite material based on sulfur (S) is not particularly limited, and a material of a positive electrode commonly used in the art can be selected and applied.

The present specification provides a battery module comprising the lithium secondary battery as a unit cell.

The battery module may be formed by stacking on a bipolar plate provided between two or more lithium secondary batteries according to one embodiment of the present specification.

If the lithium secondary battery is a lithium air battery, the bipolar plate may be porous to supply externally supplied air to a positive electrode comprised in each of the lithium air batteries. The bipolar plate may comprise, for example, porous stainless steel or porous ceramics.

Specifically, the battery module may be used as a power source of an electric vehicle, a hybrid electric vehicle, a plug-in hybrid electric vehicle, or a power storage device.

Manufacturing Method of Lithium Electrode

The present invention also relates to a method for manufacturing a lithium electrode, which may comprise forming a protective layer on one surface of lithium metal by using a copolymer containing an acetal and a fluorine-based material. The structure and specific examples of the copolymer containing an acetal and a fluorine-based material are as described above.

The copolymer containing an acetal and a fluorine-based material may be prepared by copolymerizing a monomer containing an acetal functional group and a monomer containing a fluorine-based functional group in a molar ratio of 3 to 7:7 to 3. The types, preferable molar ratios, and critical significance of the acetal and the fluorine-based material used in the preparation of the copolymer are as described above.

Thereafter, in order to form a protective layer on one surface of the lithium metal, the copolymer containing the acetal and fluorine-based material is dissolved in a solvent to prepare a coating solution. At this time, the copolymer may be dissolved in an amount of 1 to 15% by weight, preferably 2 to 10% by weight, more preferably 3 to 8% by weight, based on the total weight of the coating solution. If the amount of the copolymer is less than the above range, the protective function for lithium metal may be lowered. If the amount of the copolymer exceeds the above range, the concentration of the coating solution may be excessively increased, making it difficult to proceed with the coating process, and also, even when a protective layer is formed, cracking may occur.

In addition, the solvent used to prepare the coating solution may be at least one selected from the group consisting of tetrahydrofuran (THF), toluene, cyclohexane, N-methyl-2-pyrrolidone (NMP), dimethyl formamide (DMF), dimethyl acetamide (DMAc), tetramethyl urea, dimethyl sulfoxide (DMSO), and triethyl phosphate. Preferably, if THF is used to prepare the coating solution, the copolymer may have high solubility and may be advantageous to form a protective layer by a coating process.

In addition, the coating method for forming the protective layer may be selected from the group consisting of dip coating, spray coating, spin coating, die coating, roll coating, Slot-die coating, Bar coating, Gravure coating, Comma coating, Curtain coating, and Micro-Gravure coating, but is not limited thereto, and various coating methods that can be used to form a coating layer in the art can be used.

The protective layer thus formed may have a thickness of 0.1 μm to 10 μm, preferably 0.1 μm to 5 μm, more preferably 0.5 μm to 2 μm. The protective layer may be formed as a LiF-rich SEI layer on the surface of lithium metal to inhibit the formation of lithium dendrite. In addition, when the protective layer is applied to a lithium-sulfur secondary battery, the side reaction between the lithium metal and the polysulfide eluted from the positive electrode can be prevented, and thus the lifetime of the battery can be increased.

On the other hand, the protective layer may be formed on the current collector of the lithium metal, and the specific type and shape of the current collector are as described above.

Hereinafter, in order to facilitate understanding of the present invention, preferred examples are presented, but the following examples are intended to illustrate the present invention only. It will be apparent to those skilled in the art that various changes and modifications can be made within the scope and spirit of the present invention, and also it is obvious that such changes and modifications fall within the scope of the appended claims.

Preparation Example 1: Synthesis of Acetal (N-2,2-dimethyl-1,3-dioxolane-4-methyl)-5-norbornene-exo-2,3-dicarboximide) (AceNB)

In a 25 mL round bottom flask, 5 g of 5-norbornene-2,3-dicarboxylic acid and 4.8 g of (2,2-dimethyl-1,3-dioxolane-4-yl) methanamine are dissolved in 100 mL of toluene. To this, 0.3 ml of triethylamine is added, a condenser is mounted, and the solution is immersed in an oil bath heated to 120° C. and then refluxed for 12 hours. After the reaction is completed, only the organic layer is separated by separating the layers after washing with saturated ammonium chloride solution. The separated organic layer was purified once more using a silica column and dried to synthesize N-2,2-dimethyl-1,3-dioxolane-4-methyl)-5-norbornene-exo-2,3-dicarboximide (AceNB) represented by the following Formula 1.

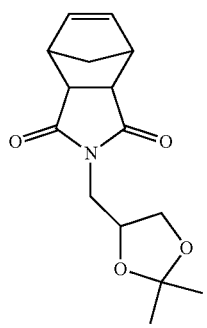

<Formula 1>

Preparation Example 2: Synthesis of Fluorine-Based Material (3,3,4,4,5,5,6,6,7,7,8,8,9,9,10,10,10-heptadecafluorodecyl 5-norbornene-2-carboxylate) (C10FNB)

In a 25 mL round bottom flask, 5 g of 5-norbornene-2-carboxylic acid and 16 g of 3,3,4,4,5,5,6,6,7,7,8,8,9,9,10,10,10-heptadecafluorodecane-1-ol are dissolved in 100 mL of methylene chloride. To this, 7.5 g of dicyclohexylcarbodiimide and 0.4 g of dimethylaminopyridine were added, and the mixture was allowed to react for 12 hours. After the reaction is completed, only the organic layer is separated by separating the layers after washing with saturated sodium bicarbonate solution. The separated organic layer was purified once more using a silica column and dried to synthesize 3,3,4,4,5,5,6,6,7,7,8,8,9,9,10,10,10-heptadecafluorodecyl 5-norbornene-2-carboxylate (C10FNB) represented by the following Formula 2.

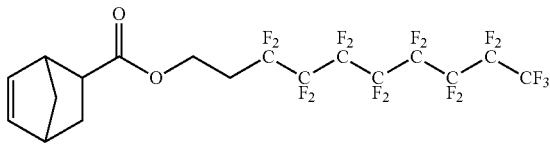

<Formula 2>

Example 1

A lithium electrode having a protective layer formed of AceNB synthesized in Preparation Example 1 and C10FNB synthesized in Preparation Example 2 in a molar ratio of 7:3 was prepared.

In a 25 mL round bottom flask, the above molar ratio of AceNB and C10FNB, and 10.00 g of tetrahydrofuran were added and the inlet was sealed. Oxygen was removed by bubbling nitrogen for 30 minutes, the reaction flask was immersed in an oil bath heated to 55° C., and then the reaction was initiated by the addition of 35.00 mg of Grubs second-generation catalyst. After 4 hours, the reaction was terminated, and the resultant obtained was precipitated twice in ethanol, followed by vacuum-drying to obtain a cyclic olefin copolymer (conversion of 99%, weight average molecular weight of 92,000).

5% by weight of the copolymer prepared by the above method was dissolved in 95% by weight of tetrahydrofuran (THF) solvent to prepare a coating solution for forming a protective layer.

(2) Formation of Protective Layer

The coating solution was coated on the surface of the lithium metal layer having a thickness of 50 μm formed on the Cu current collector using a Baker Film Applicator to form a protective layer having a thickness of 0.5 μm, thereby manufacturing a lithium electrode comprising the protective layer.

(3) Manufacture of Lithium-Sulfur Secondary Battery

A lithium-sulfur secondary battery in the form of a coin cell was manufactured by using the above-manufactured electrode as a negative electrode, a S/C complex as positive electrode, a composition containing a solvent, DOL/DME (1:1, v/v) (DOL: dioxolane, DME: dimethoxyethane) and 1 M LiTFSI and 3 wt. % LiNO$_3$, as an electrolyte solution Example 2

A lithium electrode and a lithium-sulfur secondary battery were manufactured in the same manner as in Example 1, except that the lithium electrode and the lithium-sulfur secondary battery comprise a protective layer formed using a copolymer (weight average molecular weight of 85,000) copolymerized with AceNB and C10FNB in a molar ratio of 5:5.

Example 3

A lithium electrode and a lithium-sulfur secondary battery were manufactured in the same manner as in Example 1, except that the lithium electrode and the lithium-sulfur secondary battery comprise a protective layer formed using a copolymer (weight average molecular weight of 62,000) copolymerized with AceNB and C10FNB in a molar ratio of 3:7.

Example 4

A lithium-lithium battery was manufactured in the same manner as in Example 1, except that the lithium electrodes comprising a protective layer formed using a copolymer copolymerized with AceNB and C10FNB in a molar ratio of 7:3 are used as negative and positive electrodes.

Example 5

A lithium-lithium battery was manufactured in the same manner as in Example 1, except that the lithium electrodes comprising a protective layer formed using a copolymer copolymerized with AceNB and C10FNB in a molar ratio of 5:5 are used as negative and positive electrodes.

Example 6

A lithium-lithium battery was manufactured in the same manner as in Example 1, except that the lithium electrodes comprising a protective layer formed using a copolymer copolymerized with AceNB and C10FNB in a molar ratio of 3:7 are used as negative and positive electrodes.

Example 7

A lithium electrode and a lithium-sulfur secondary battery were manufactured in the same manner as in Example 1, except that the lithium electrode and the lithium-sulfur secondary battery comprise a protective layer formed using a copolymer (weight average molecular weight of 85,000) copolymerized with AceNB and C10FNB in a molar ratio of 2:8.

Example 8

A lithium electrode and a lithium-sulfur secondary battery were manufactured in the same manner as in Example 1, except that the lithium electrode and the lithium-sulfur secondary battery comprise a protective layer formed using a copolymer (weight average molecular weight of 85,000) copolymerized with AceNB and C10FNB in a molar ratio of 8:2.

Comparative Example 1

A lithium-sulfur secondary battery was manufactured in the same manner as in Example 1, except that a lithium electrode without a protective layer is used as a negative electrode, and S/C composite is used as a positive electrode.

Comparative Example 2

A lithium-lithium battery was manufactured in the same manner as in Example 1, except that lithium electrodes without a protective layer are used as a negative electrode and a positive electrode, respectively.

Comparative Example 3

A lithium electrode and a lithium-sulfur secondary battery were manufactured in the same manner as in Example 1, except that the lithium electrode and the lithium-sulfur secondary battery comprise a protective layer formed using a polymer (weight average molecular weight of 180,000) of AceNB when forming the protective layer.

Comparative Example 4

A lithium electrode and a lithium-sulfur secondary battery were manufactured in the same manner as in Example 1, except that the lithium electrode and the lithium-sulfur secondary battery comprise a protective layer formed using a polymer of C10FNB when forming the protective layer.

Experimental Example 1: Measurement of Discharging Capacity and Coulombic Efficiency of Lithium Electrode After setting the charging and discharging rates in the charging/discharging device to 2.8 mA and 4.7 mA, respectively, the charging/discharging cycles were performed for the coin cells manufactured in the examples and the comparative examples, respectively.

FIG. 1 is a graph showing specific discharging capacity and coulombic efficiency measured by charging/discharging coin cells manufactured in Example 1 and Comparative Example 1, respectively.

FIG. 2 is a graph showing specific discharging capacity and coulombic efficiency measured by charging/discharging coin cells manufactured in Example 2 and Comparative Example 1, respectively.

FIG. 3 is a graph showing specific discharging capacity and coulombic efficiency measured by charging/discharging coin cells manufactured in Example 3 and Comparative Example 1, respectively.

Referring to FIG. 1, it can be seen that Example 1 which comprises a lithium negative electrode having a protective layer including a copolymer prepared by copolymerizing AceNB and C10FNB at a molar ratio of 7:3 has increased cycle lifetime, as compared to Comparative Example 1 which comprises a lithium negative electrode without a protective layer.

Referring to FIG. 2, it can be seen that Example 2 which comprises a lithium negative electrode having a protective layer including a copolymer prepared by copolymerizing AceNB and C10FNB at a molar ratio of 5:5 has increased cycle lifetime, as compared to Comparative Example 1 which comprises a lithium negative electrode without a protective layer.

Referring to FIG. 3, it can be seen that Example 3 which comprises a lithium negative electrode having a protective layer including a copolymer prepared by copolymerizing AceNB and C10FNB at a molar ratio of 3:7 shows high discharging capacity during charging/discharging cycles, as compared to Comparative Example 1 which comprises a lithium negative electrode without a protective layer.

FIG. 4 is a graph showing specific discharging capacity and coulombic efficiency measured by charging/discharging coin cells manufactured in Comparative Example 1 and Comparative Example 3, respectively.

Referring to FIG. 4, Comparative Example 3, which is a case of forming a protective layer on a lithium negative electrode using only AceNB, shows that discharging capacity and cycle lifetime are reduced, as compared to Comparative Example 1 in which no protective layer is formed on both the positive and negative electrodes. From this, it can be seen that both AceNB and C10FNB are required as materials for forming a protective layer of the lithium negative electrode in order to improve discharging capacity and coulombic efficiency of the battery.

FIG. 5 is a graph showing specific discharging capacity measured by charging/discharging coin cells manufactured in Examples 1, 7, and 8, and Comparative Example 1, respectively.

Referring to FIG. 5, it was confirmed that Comparative Example 1 has a significantly lower discharging capacity than Examples 1, 7, and 8, and in the case of Example 1 of the examples, discharging capacity is not reduced even if the cycle is repeated.

FIG. 6 is a graph showing specific discharging capacity measured by charging/discharging coin cells manufactured in Comparative Example 1, and Comparative Example 4, respectively.

Referring to FIG. 6, it was confirmed that in both Comparative Example 1 and Comparative Example 4, the discharging capacity is significantly reduced as the cycle is repeated.

Experimental Example 2: Observation of the Surface of the Lithium Electrode

FIG. 7 is a photograph showing the surfaces of the lithium negative electrodes in a charged state disassembled and observed after charging and discharging 25 times for the coin cell-type lithium-lithium batteries of Examples 4 to 6 and Comparative Example 2.

Referring to FIG. 7, it can be seen that the lithium negative electrodes of Examples 4 to 6 have a uniform surface shape as compared to Comparative Example 2 even after several charging/discharging.

Although the present invention has been described with reference to the limited examples and drawings, it is to be understood that the present invention is not limited thereto and that various modifications and variations are possible within the technical idea of the present invention and the scope equivalent to the claims set forth below.

The invention claimed is:
1. A lithium electrode comprising:
   a lithium metal; and
   a protective layer on at least one surface of the lithium metal,
   wherein the protective layer comprises a copolymer comprising a monomer unit A comprising an acetal and a monomer unit B comprising a fluorine-based material, wherein the fluorine-based material is at least one selected from the group consisting of 3,3,4,4,5,5,6,6,7,7,8,8,9,9,10,10,10-heptadecafluorodecyl 5-norbornene-2-carboxylate;
   N-(3,3,4,4,5,5,6,6,7,7,8,8,9,9,10,10,10-heptadecafluoro-decyl)-5-norbornene-exo-2,3-dicarboximide; N-(2-(2,2,3,3,4,4,4-heptafluorobutyl))-5-norbornene-2,3-dicarboxylic acid;
   N-(2-(2,2,3,3,4,4,4-heptafluorobutyl))-5-norbornene-exo-2,3-dicarboximide;
   N-(pentafluorophenyl)-5-norbornene-2,3-dicarboxylic acid; and N-(pentafluorophenyl)-5-norbornene-exo-2,3-dicarboximide.

2. The lithium electrode according to claim 1, wherein the monomer unit A comprising the acetal is a monomer unit comprising an acetal functional group, and the acetal functional group is at least one selected from the group consisting of 1,3-dioxolane and 2-methyl-1,3-dioxolane.

3. The lithium electrode according to claim 1, wherein the monomer unit A comprising the acetal is at least one selected from the group consisting of (N-2,2-dimethyl-1,3-dioxo-lane-4-methyl)-5-norbornene-exo-2,3-dicarboximide; N-(4-methyl-2,2-dimethyl-1,3-dioxolane)-5-norbornene-2,3-di-carboxylic acid imide; N-(4-methyl-2,2,4-trimethyl-1,3-dioxolane)-5-norbornene-2,3-dicarboxylic acid imide; N-(5-methyl-2,2-dimethyl-1,3-dioxane)-5-norbornene-2,3-dicarboxylic acid imide; N-(5-methyl-2,2,5-trimethyl-1,3-dioxane)-5-norbornene-2,3-dicarboxylic acid imide; and (2,2-dimethyl-1,3-dioxolane-4-yl)methyl-5-norbornene-2-carboxylate.

4. The lithium electrode according to claim 1, wherein a molar ratio of the monomer unit A comprising the acetal and the monomer unit B comprising the fluorine-based material is 3 to 7:7 to 3.

5. The lithium electrode according to claim 1, wherein the protective layer has a thickness of 0.1 μm to 10 μm.

6. The lithium electrode according to claim 1, further comprising:
   a current collector,
   wherein the lithium metal is a layer formed on one side of the current collector, or the lithium metal is in a form of a structure which is formed by lithium metal aggregated in the form of particle.

7. The lithium electrode according to claim 1, wherein the lithium metal has a thickness of 5 μm to 150 μm.

8. A lithium secondary battery comprising the lithium electrode of claim 1.

9. The lithium secondary battery according to claim 8, wherein the lithium secondary battery is a lithium-sulfur secondary battery.

10. The lithium electrode according to claim 1, wherein a weight average molecular weight of the copolymer of monomer unit A and monomer unit B is in a range of 10,000 to 1,000,000.

* * * * *